Nov. 1, 1960

F. C. DANIELSON 2,958,383

CULTIVATOR ATTACHMENT

Filed July 3, 1958

INVENTOR.
Frank C. Danielson,
BY
McMorrow, Berman & Davidson
ATTORNEYS

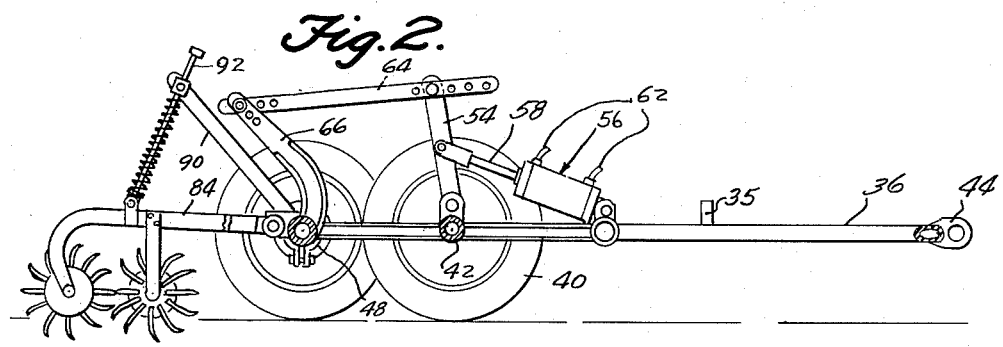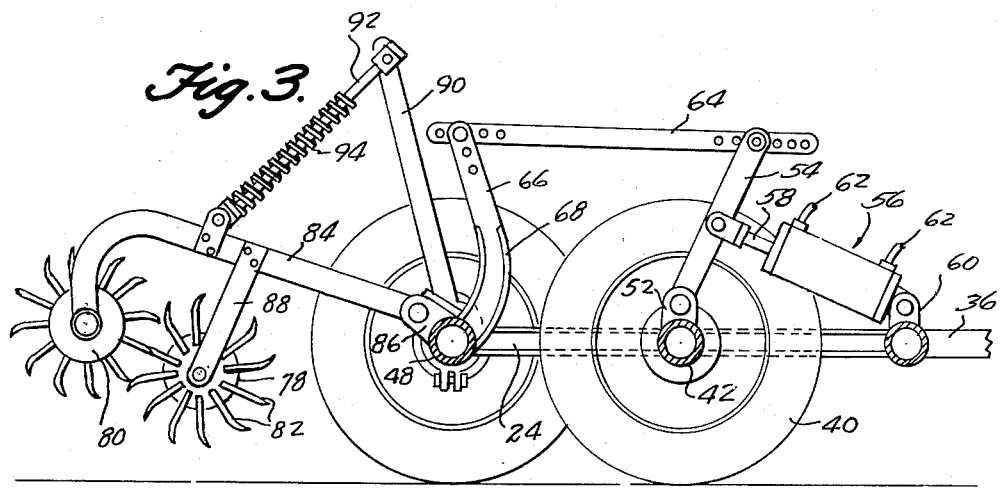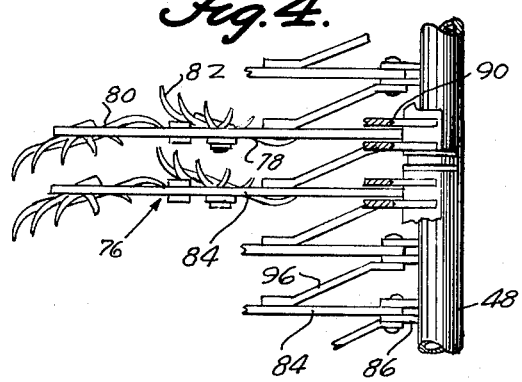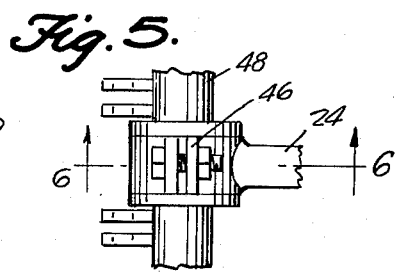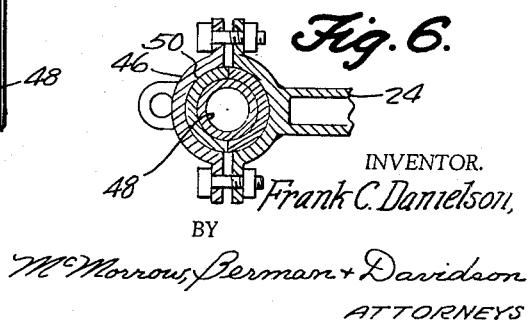

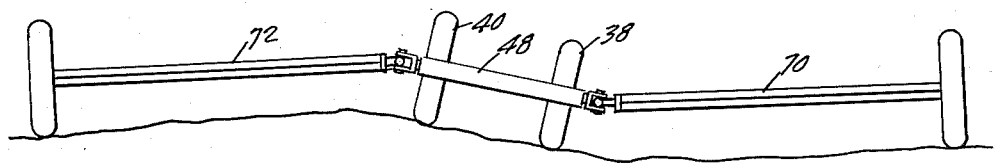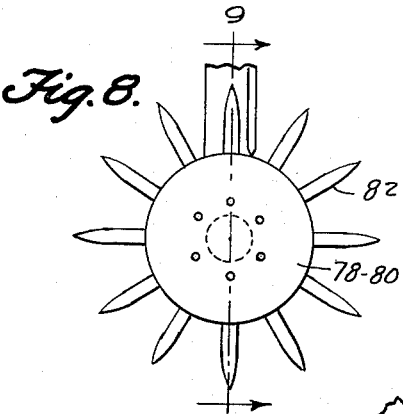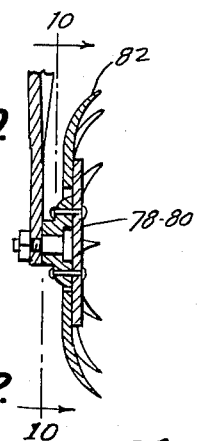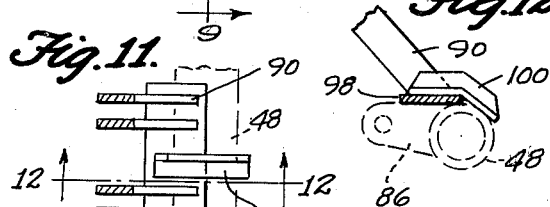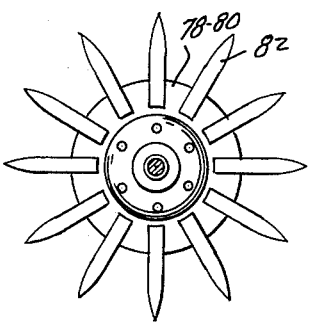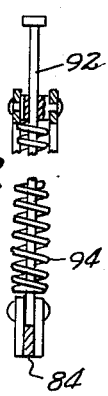

United States Patent Office 2,958,383
Patented Nov. 1, 1960

2,958,383

CULTIVATOR ATTACHMENT

Frank C. Danielson, R.F.D., Waitsburg, Wash., assignor to Maudie J. Danielson, executrix of said Frank C. Danielson, deceased Filed July 3, 1958, Ser. No. 746,372

3 Claims. (Cl. 172—456)

The present invention relates to farm implements generally and in particular to a cultivator for attachment to a towing vehicle.

An object of the present invention is to provide a cultivator attachment which lends itself to efficient breaking of a crust formed on a ground surface due to the action of the sun and wind, such crust generally preventing the sprouting of grain planted thereunder.

Another object of the present invention is to provide a cultivator attachment of the rotary spike variety which may be regulated as to the depth of working of the spikes of the cultivator in the ground surface.

A further object of the present invention is to provide a cultivator attachment which is simple in structure, one sturdy in construction, one economical to manufacture and assemble, and one which is highly effective in action.

These and other objects and advantages of the present invention will be fully apparent from the following description when taken in conjunction with the annexed drawings, in which:

Figure 2 is a side view partially in section as seen on line 2—2 of Figure 1, on a reduced scale, with the ground-working cultivator wheels in a ground-engaging position;

Figure 3 is a fragmentary view similar to Figure 2, showing the ground-working cultivator wheels in a raised position, and on an enlarged scale;

Figure 4 is a fragmentary plan view of the cultivator elements and their attachment to the lift arms;

Figure 5 is another partial or fragmentary plan view, showing the attachment of the beam of the cultivator to the mobile frame;

Figure 6 is a view taken on the line 6—6 of Figure 5;

Figure 8 is an elevational view of one of the cultivator wheels;

Figure 9 is a view taken on the line 9—9 of Figure 8;

Figure 10 is a view taken on the line 10—10 of Figure 9;

Figure 11 is a fragmentary view from above showing the attachment of the support arms for the cultivator wheels to the beam;

Figure 12 is a partial view, in isometric form, taken on the line 12—12 of Figure 11;

Figure 13 is a fragmentary view with a portion broken away of the resilient means set for the support of each of the cultivator wheels; and Figure 14 is a view from the rear of the wheel-supported beams and auxiliary beams traversing an uneven ground surface.

Figures 1, 7:
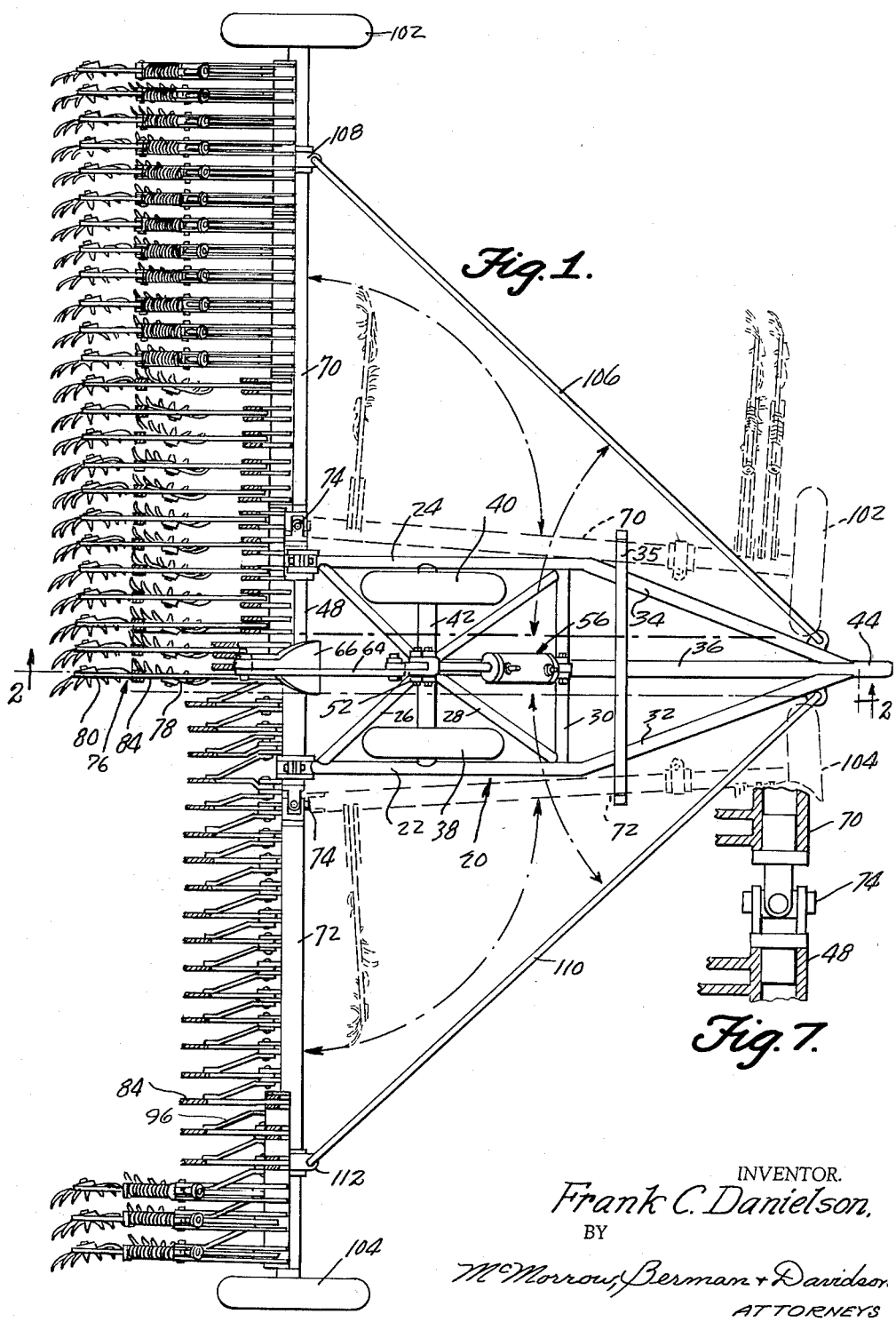
Figure 1 is a plan view of the cultivator attachment according to the present invention, with a section of the ground-engaging spiked wheels removed to show the supporting means, the dotted line showing indicating the folded or traveling position of the cultivator attachment.
Figure 7 is a fragmentary sectional view, on an enlarged scale, of the connecting means of the auxiliary beam to the beam of the cultivator.

Referring in greater detail to the drawings, in which like numerals indicate like parts throughout the several views, the reference numeral 20 designates a mobile frame having side members 22 and 24, cross members 26 and 28, a forward frame member 30, inwardly converging forward end members 32 and 34, and a tongue 36 projecting forwardly of a pair of wheels 38 and 40 arranged in spaced relation and supported upon an axle 42 which has its ends anchored in the side members 22 and 24. Hitch means, as at 44 in Figure 2, is provided on the forward end of the tongue 36 for attachment of the mobile frame 20 to a towing vehicle.

A split collar 46 is carried on the rearward end of each of the side members 22 and 24 for the support of a horizontally disposed rotatable beam 48. One such collar 46 is shown in detail in Figures 5 and 6. Each collar 46 is supported upon a bearing sleeve 50 surrounding the adjacent portion of the beam 48.

A pair of projections 52 project upwardly from the rigid axle 42 and form a pivotal connection for an upwardly extending arm 54. An elevating and lowering mechanism, embodying a hydraulic cylinder assembly 56, is carried on the frame member 30 intermediate the ends of the latter, the free end of the actuating arm of the assembly 56 being pivotally connected to an intermediate portion of the arm 54, the hydraulic cylinder assembly arm being designated by the numeral 58. The end of the hydraulic cylinder assembly 56 remote from the arm 58 is pivotally connected to another pair of trunnions 60 projecting upwardly from the frame member 30. Flexible conduits 62 connect the hydraulic cylinder assembly 56 to a source of fluid power on the towing vehicle.

The upper end of the arm 54 is connected to a more or less horizontally disposed actuating lever 64 at the forward end of the latter. The rearward end of the lever 64 is connected to the upper end of an upwardly extending power arm 66 which has its lower end portion provided with outwardly flaring flanges constituting stiffening members as at 68 in Figure 3. The lower end of the power arm 66 is fixedly secured by welding or other suitable means to the beam 48 at a midpoint of the latter.

An auxiliary beam 70 is arranged adjacent one end of the beam 48 in end to end aligned relation with respect to the beam 48 and has its confronting end secured to the confronting end of the beam 48 for movement from the end to end aligned position to a position, shown in dotted lines in Figure 1, in which the non-confronting end is adjacent to and spaced from the forward end of the frame 20. Another auxiliary beam 72 is similarly arranged with respect to the other end of the beam 48 and is similarly connected for movement from the end to end aligned position shown in full lines in Figure 1 to the dotted line position in which the end remote from the hinge connection of the beam 72 to the beam 48 is adjacent the forward end of the frame 20. The means connecting the auxiliary beams 70 and 72 to the beam 48 is shown in detail in Figure 7 with reference to the auxiliary beam 70, such means comprising a universal joint 74 having its ends connected to the confronting ends of the auxiliary beam 70 or 72.

A plurality of cultivator elements arranged in a laterally spaced upstanding direction are positioned beneath, behind, and along the beam 48 and the auxiliary beams 70 and 72 and are connected to the respective beam and auxiliary beams for movement therewith from a ground-engaging position shown in Figure 2 to an upright out of engagement with the ground position as shown in Figure 3. Each cultivator element, designated generally by the numeral 76, consists in a pair of hubs 78 and 80 arranged in tandem spaced relation with each hub having a plurality of spikes 82 projecting radially therefrom. As shown most clearly in Figure 4, the spikes 82 of the hub 78 are inwardly curving toward the axis rotation of the hub 78, the free end portions of the spikes 82 being bowed toward the axis of the hub 78 and the bowed portions of the spikes 82 facing forwardly and away from the bowed portions of the spikes 82 which also face forwardly and toward the axis of rotation of the hub 80.

Each pair of hubs 78 and 80 is mounted upon a rearwardly projecting arm 84 having its forward end pivotally connected and supported by a bracket member 86 secured to the beam 48. The hub 80 of each pair is carried on the rearward end of the arm 84 while the hub 78 of each pair is carried on a bar 88 projecting downwardly from an intermediate part of the arm 84.

Fixedly secured to each bracket 86 is an upwardly sloping lifting arm 90 loosely receiving in its upper end a support member 92 about which is circumposed a coil spring 94. The spring 94 forms a resilient means by which the arm 84 is pressed downwardly by the lift arm 90 so that the spikes 82 of the hubs 78 and 80 work the ground surface to the depth required. As shown in Figure 2, the support 92 is slidable in the upper end of the lift arm 90 so that if the cultivator wheels or assembly of hubs and spikes strike a rock, they may be pressed upwardly against the force of the spring 94 associated with each pair of cultivator wheels or elements.

Each arm 84, as shown in Figure 4, is braced by a member 96 to the adjacent bracket member 86 on the axle 48. As shown in Figure 11, and Figure 12, the means connecting the upwardly extending lift arm 90 to the axle 48 includes a flat bar 98 surmounting the axle 48 and anchoring the lower ends of each of the lift arms 90, there being at intervals an angle member 100 reinforcing the attachment of the plate 98 to the axle 42.

A ground-engaging wheel 102 is positioned on the nonconfronting end of the auxiliary beam 70 and another ground-engaging wheel 104 is positioned adjacent the nonconfronting end of the auxiliary beam 72, said wheels 102 and 104 supporting the auxiliary beams 70 and 72, respectively.

A bar 106 has its forward end connected to the forward end portion of the frame member 34 and has its rearward end received in a socket 108 provided on the auxiliary beam 70. Another bar 110 is similarly positioned with respect to the frame member 32 and another socket 112 on the auxiliary beam 72. The bars 106 and 110 constitute fastening elements carried by the frame 20 and detachably securable to the auxiliary beams 70 and 72 for releasably holding the latter in the end to end relation position with respect to the beam 48. When the auxiliary beams 70 and 72 are moved from the end to end aligned position to the forward position, the bars 106 and 110 move to the dotted line positions inwardly of the adjacent wheels 38 and 40, as shown in dotted lines in Figure 1.

In Figure 14 a feature of the invention is shown in which the flexibility of the auxiliary beams will reflect to the beam 48, as afforded by the two universal joints 74, permits the cultivator attachment of the present invention to travel over uneven ground with predetermined degree of flexibility, permitting even and efficient working of the ground surface by the cultivator elements.

In use, the hydraulic cylinder assembly 56 is used to control the heighth of the cultivator elements on the ends of the arms 84, the spikes 82 of the hubs 78 and 80 being arranged so that they efficiently engage the ground and pulverize the same with a particularly efficient ground-working action suitable for crusted soils and for soils in which grain has been planted but not spotted through the soil.

When it is desired to move the cultivator attachment of the present invention over a road surface or from one field to another through a narrow opening or gate, the bars 106 are detached from the auxiliary beams 70 and 72, respectively, and the beams 70 and 72 are shifted forwardly to the dotted line position shown in Figure 1 with a bar 35 extending across the forward end of the frame 20 and supporting the auxiliary beams in the forward position.

What is claimed is:

1. A cultivator attachment comprising a mobile frame including spaced side members, a forward frame member supported in the forward ends of said side members, an axle supported in said side members intermediate the forward and rearward ends thereof, supporting wheels carried by said axle, and means provided on the forward frame member for attachment to a towing vehicle, an upwardly extending arm having the lower end connected to said axle for pivotal movement about said axle, a hydraulic cylinder assembly carried by said forward frame member, a reciprocating actuating arm projecting out of said assembly and having the free end pivotally connected to said arm intermediate the ends thereof, a beam extending transversely of said side members adjacent the rearward ends thereof and rotatably supported in the rearward ends of said side members, an upwardly extending power arm positioned intermediate the ends of said beam and having the lower end fixedly secured to said beam, an actuating lever connecting the upper end of said power arm to the upper end of said upwardly extending arm, a first group of cultivator elements arranged in a laterally spaced upstanding direction positioned beneath and along said beam, a first group of rearwardly projecting arms each carrying a cultivator element of said first group of cultivator elements and pivotally connected to said beam, a first auxiliary beam arranged adjacent one end of said beam and in confronting end-to-end aligned relation with respect to said beam, means connecting the confronting ends together for movement of said auxiliary beam from the end-to-end aligned position to a position in which the non-confronting end is adjacent to and spaced from the forward end of said frame, a second group of cultivator elements arranged in laterally spaced upstanding direction positioned beneath and along said first auxiliary beam, a second group of rearwardly projecting arms each carrying a cultivator element of said second group of cultivator elements and pivotally connected to said first auxiliary beam, a second auxiliary beam arranged adjacent the other end of said beam and in confronting end-to-end aligned relation with respect to said beam, means connecting the confronting ends together for movement of said second auxiliary beam from the end-to-end aligned position to a position in which the non-confronting end is adjacent to and spaced from the forward end of said frame, a third group of cultivator elements arranged in a lateral spaced upstanding direction positioned beneath and along said second auxiliary beam, a third group of rearwardly projecting arms each carrying a cultivator element of said third group of cultivator elements and pivotally connected to said second auxiliary beam, a ground-engaging wheel mounted on the non-confronting end of each of said first and second auxiliary beams and supporting said auxiliary beams, an upwardly-extending lift arm fixed to each of said first beam and said first and second auxiliary beams and operatively connected to an adjacent one of the rearwardly-projecting arms of said first, second, and third groups, and rigid bars carried by said frame and each having an end detachably securable to each of said auxiliary beams for releasably holding the latter in the end-to-end relation position with respect to said beam.

2. The cultivator attachment according to claim 1 wherein each of the means connecting the confronting ends of said beam and said first and second auxiliary beams embodies a universal joint.

3. In a cultivator attachment, a mobile frame including spaced side members, a forward frame member supported in the forward ends of said side members, an axle supported in said side members intermediate the forward and rearward ends thereof, supporting wheels carried by said axle, and means provided on the forward frame member for attachment to a towing vehicle, an upwardly extending arm having the lower end connected to said axle for pivotal movement about said axle, a hydraulic cylinder assembly carried by said forward frame member, a reciprocating actuating arm projecting out of said assembly and having the free end pivotally connected to said arm intermediate the ends thereof, a beam extending transversely of said side members adjacent the rearward ends thereof and rotatably supported in the rearward ends of said side members, an upwardly extending power arm positioned intermediate the ends of said beam and having the lower end fixedly secured to said beam, an actuating lever connecting the upper end of said power arm to the upper end of said upwardly extending arm, a group of cultivator elements arranged in a laterally spaced upstanding direction positioned beneath and along said beam, a group of rearwardly projecting arms each carrying one of said cultivator elements and pivotally connected to said beam, and a plurality of upwardly-extending lift arms fixed to said beam and each operatively connected to a rearwardly-projecting arm of said group.

References Cited in the file of this patent

UNITED STATES PATENTS

| | | |
|---|---|---|
| 1,388,498 | Welke | Aug. 23, 1921 |
| 1,927,458 | Klise | Sept. 19, 1933 |
| 2,298,161 | Robinson | Oct. 6, 1942 |
| 2,828,597 | Moore | Apr. 1, 1958 |
| 2,828,680 | Johnson | Apr. 1, 1958 |